United States Patent [19]

Gottschild

[11] Patent Number: 4,784,309

[45] Date of Patent: Nov. 15, 1988

[54] SOLDERING MACHINE WITH COOLED GUIDE PROFILES

[75] Inventor: Wilfried Gottschild, Wertheim/Main, Fed. Rep. of Germany

[73] Assignee: FRSA Erust Sacks KG GmbH & Co., Fed. Rep. of Germany

[21] Appl. No.: 19,597

[22] Filed: Feb. 26, 1987

[30] Foreign Application Priority Data

Mar. 1, 1986 [DE] Fed. Rep. of Germany ....... 3607089

[51] Int. Cl.⁴ .......................... B23K 3/00; H05K 3/34
[52] U.S. Cl. ....................................... 228/37; 228/43; 228/46
[58] Field of Search ............................. 228/46, 37, 43; 432/234; 198/952

[56] References Cited

U.S. PATENT DOCUMENTS

| | | | |
|---|---|---|---|
| 2,730,982 | 1/1956 | Socke | 228/46 X |
| 3,122,117 | 2/1964 | Marzrllo et al. | 228/43 X |
| 3,604,611 | 1/1969 | Lamberty | 228/37 X |
| 4,035,141 | 7/1977 | Knaak | 432/234 |
| 4,139,143 | 2/1979 | Gumprecht | 228/37 X |

Primary Examiner—Kenneth J. Ramsey
Attorney, Agent, or Firm—McGlew and Tuttle

[57] ABSTRACT

A soldering machine with two parallel guide profiles for revolving chains provided for with soldering fingers, include a succession of a fluxer, a preheater and a solder bath along with the guide profiles extend. One profile is mounted fixed laterally above the succession and the other is adjustable directly above the succession. Thereby the adjustable guide profile is heated up more, especially under the action of the preheater, whereby, due to elongations of the guide profile, problems arise in the conduction of printed circuit boards held at the revolving chains by means of soldering fingers. To eliminate this problem, the invention provides that each guide profile is provided with at least one longitudinally extending coolant duct and that each coolant duct is connected to a pump for a coolant. Thereby the temperature actions on the adjustable guide profile 5 are compensated.

10 Claims, 4 Drawing Sheets

SOLDERING MACHINE WITH COOLED GUIDE PROFILES

FIELD AND BACKGROUND OF THE INVENTION

The present invention relates in general to soldering machines and in particular to a new and useful soldering machine which includes a pair of spaced apart guide profiles that extend along a path carrying a succession of a fluxer, a multistage preheater and a solder bath, for soldering circuit boards, and wherein the guide profiles are provided with cooling ducts for cooling and distributing heat evenly between the guide profiles.

In a soldering machine of the species in question, one guide profile may be arranged laterally above the succession of fluxer, preheater and solder bath, whereas the other, adjustable guide profile must be located above the succession of fluxer, preheater and solder bath to adapt the distance between the two guide profiles to the dimensions of the printed circuit boards to be guided by the soldering fingers over the fluxer, preheater and solder bath. In standard soldering machines the adjustment path of the adjustable guide profile relative to the fixed guide profile is up to about 400 mm.

In the operation of the soldering machine, the adjustable guide profile is heated considerably more by the succession of fluxer, preheater and solder bath, but in particular by the heat action of the preheater, than the fixed guide profile located essentially laterally next to the succession of fluxer, preheater and soldering bath. This stronger heating of the adjustable guide profile results in a lengthening of the adjustable profile and this has disadvantageous effects in different ways. For one thing, the running speed of the revolving chain passed around the adjustable guide profile changes, so that a non-parallel conduction of the circuit boards at the soldering fingers of the fixed and of the adjustable guide profiles takes place, resulting in defects of the contact connections to be soldered due to the oblique soldering. In addition deformation of the soldering finger conduction occurs under the action of heat. This heating adversely affects the lateral displacement of the adjustable guide profile. This transport displacement, therefore, may tend to jam.

SUMMARY OF THE INVENTION

It is the object of the present invention to provide a soldering machine of the kind in question wherein the temperatures of the succession of fluxer, preheater and solder bath acting on the two guide profiles, in particular the temperature of the preheater, are compensated so that despite increased temperature action on the adjustable profile, no change of length of the adjustable guide profile relative to the fixed guide profile occurs, so that the soldering finger conduction can occur synchronously around both guide profiles, and a uniform lateral adjustability of the adjustable guide profile is ensured for all temperature ranges.

Accordingly another object of the present invention is to provide a soldering machine for soldering objects, such as circuit boards, comprising a fluxer for applying flux to the object, a preheater for preheating the object, a solder bath for applying solder to the object, the fluxer, preheater and solder bath lying in succession in a transport direction for the object, a fixed guide profile extending parallel to the transport direction and adjacent the fluxer, preheater and solder bath, an adjustable guide profile extending parallel to the transport direction and being mounted for movement toward and away from the fixed guide profile in a direction which is across the transport direction, each of the fixed and adjustable guide profiles including each at least one longitudinally extending coolant duct for receiving coolant therein for cooling the fixed and adjustable guide profiles, and pump means connected to the ducts for circulating coolant through the ducts.

Through the use of coolant traversing the longitudinally extending coolant ducts, which coolant is circulated by means of at least one pump means, no changes in length occur at the adjustable guide profile even in case of different heating relative to the fixed guide profile, so that synchronous revolutions of the revolving chains and hence of the soldering fingers occur. Also the lateral adjustability of the adjustable guide profile is not impeded, since due to the cooling of the adjustable guide profile jamming of the lateral transport displacement for the adjustable guide profile no longer occurs.

Additional advantageous of the invention include the use of connecting the coolant ducts to a single cycle system or in a two-cycle system, controlled cooling being possible through suitable conduction of the coolant stream in relation to the transport direction.

A still further object of the invention is to provide a soldering machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

Several embodiments of the present invention are illustrated in the drawings, in which.

Figure 1:
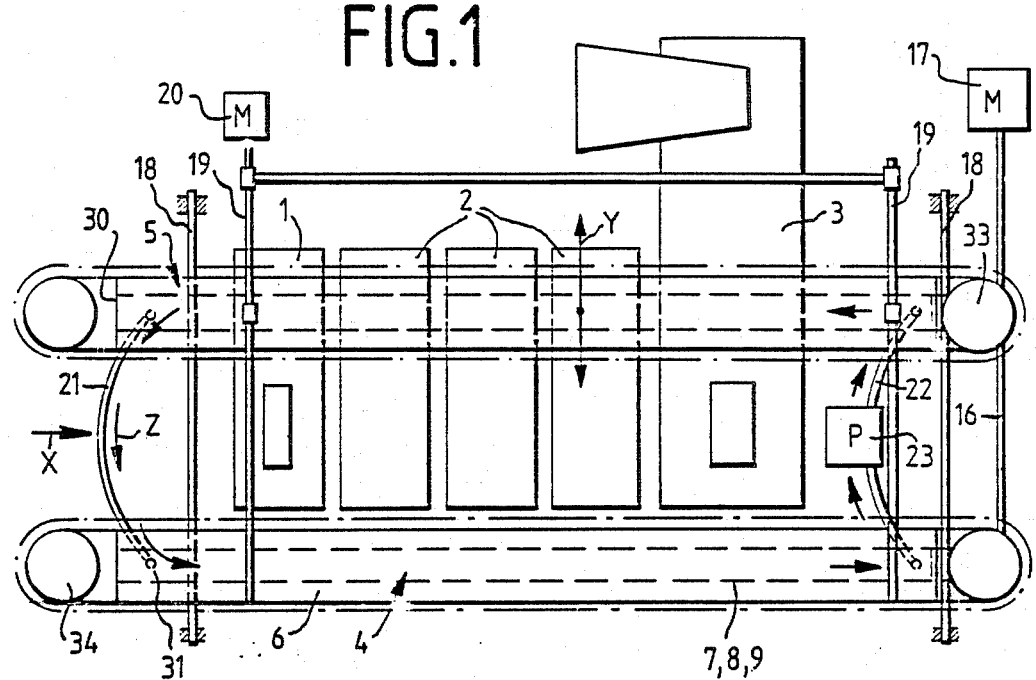
FIG. 1 is a top plan view of a soldering machine according to the invention with a single cycle cooling system.

Referring now to the drawings in particular, the invention embodied in FIG. 1 comprises a soldering machine for soldering objects, such as circuit boards. The soldering machine of the present invention comprises a fluxer 1, a multi-stage preheater 2, and a solder bath 3, which lie in succession in the transport direction shown at arrow X. Laterally of and above the fluxer 1, preheater 2 and solder bath 3, is a guide profile 4 that is firmly connected to the base frame of the machine in a manner not shown in detail. Parallel to the guide profile 4, and at the same height above the fluxer 1, preheater 2 and solder bath 3, is an adjustable guide profile 5. Guide profile 5 is adjustable in the lateral direction shown by the arrows Y. The distance between the fixed guide profile 4 and the adjustable guide profile 5 is normally up to about 400 mm.

Figure 4:
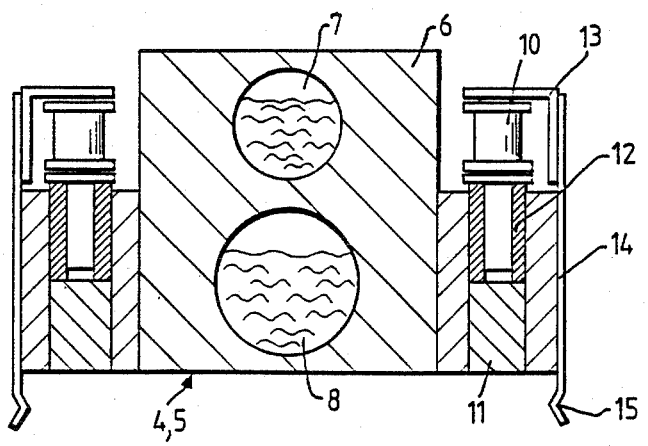
FIG. 4 is a sectional view taken through a guide profile of the invention with two parallel coolant ducts therein.
Figure 6:
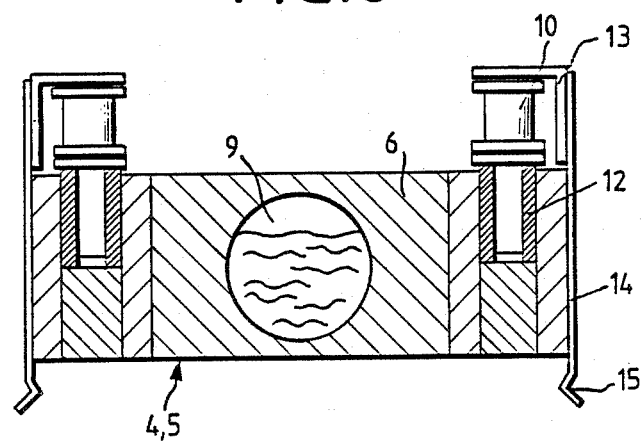
FIG. 6 is a transverse sectional view taken through a guide profile of the invention with a longitudinally extending coolant duct therein.

FIGS. 4 and 6 show transverse sectional views through a guide profile 4 or 5, the guide profile 4, 5 consists of a profile rod 6 of approximately rectangular cross section, which in the embodiment according to FIG. 4 is provided with two coolant ducts 7 and 8 of circular cross section, and in the embodiment of FIG. 6, with a single coolant duct 9. All coolant ducts 7 to 9 extend lengthwise through the profile rod 6 of the guide profiles 4, 5.

Guided around the profile rods 6 are revolving roller chains 10. To this end, U-shaped guides 11 are attached to the profile rods 6. Guide bushing 12 of the roller chains 10 are guided in the interior of the guides 11. Chains 10 are endless and revolve in the plane above the succession of fluxer 1, preheater 2 and solder bath 3 around the profile rod 6 and about a vertical axis. At their upper ends, the revolving roller chains 10 carry brackets 13, on which soldering fingers 14 are screwed or riveted. Alternatively, in a manner not shown in detail, the soldering fingers 14 may be formed to be flapped up relative to the roller chains 10.

Figure 5:
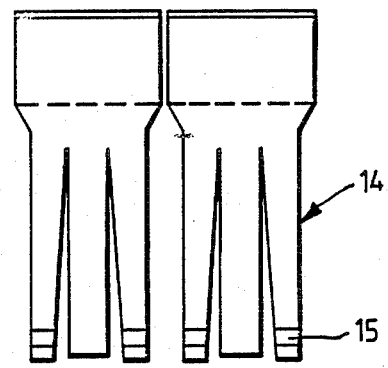
FIG. 5 is a side elevational view of the soldering fingers for revolving around the guide profiles.

The soldering fingers 14 are shown in a side view in FIG. 5. L-shaped angles 15 are provided at the lower end of each finger. These are shaped so that the soldering fingers 14 revolving on facing runs of the chains 10 of the two guide profiles 4, 5, can carry circuit boards between them for transporting the boards over the succession of fluxer 1, preheater 2 and solder bath 3.

The revolving roller chains 10 of the two guide profiles 4, 5 are jointly driven by a motor 17 via a drive shaft 16, the drive shaft 16 being designed as a spline shaft on which a matching counter-profile of a drive pinion or gear is slidable for adjustability of the guide profile 5. The guide profile 5 itself is guided on tracks 18 and is adjustable by a drive motor 20 by mean of adjustable drive 19 (e.g. threaded rods that are threaded into blocks fixed to profile 5). The specific form of the parts 16 to 20 is not illustrated in detail but are of conventional design.

To avoid major heating of the adjustable guide profile 5, which is movably guided above the succession of the fluxers 1, preheater 2 and solder bath 3 relative to the guide profile 4 that is fixed laterally above the succession, the coolant ducts 6 to 9 are provided inside the profile rods 6 of the guide profiles 4, 5. In the embodiment of FIG. 1, a coolant duct 9 per FIG. 6 is formed in the profile rod 6. To this end the coolant ducts 9 are interconnected at both ends of the guide profiles 4, 5 via connecting hoses or lines 21, 22 a coolant pump 23 being; inserted in the connecting hose 22 and the hose 21 being a return line between profiles 4 and 5. A single cycle cooling system is thus formed, the flow of the coolant being indicated by arrows Z.

In the embodiment according to FIG. 2, again, profile rods 6 with a coolant duct 9 per FIG. 6 are provided. At both ends of the guide profiles 4, 5, connecting hoses 22, 25 are connected to the coolant ducts 9. The hoses 22 are connected to the pump 23, which in turn is connected to a tank 24 for coolant via an additional connecting hose 26. The two connecting hoses 25 are connected to tank 24 on the side away from pump 23. Thus, partial streams of the coolant are supplied by pump 23 to the coolant ducts 9 in the direction of the arrows Z through the connecting hoses 22. At the end of said ducts the heated coolant emerges via the connecting hoses 25 and is resupplied to tank 24 from which the coolant is supplied to pump 23 via the connecting hose 26. Thus a two-cycle cooling system is formed, which contains the common pump 23, the common tank 24 for coolant and the common connecting line 26.

Figure 3:
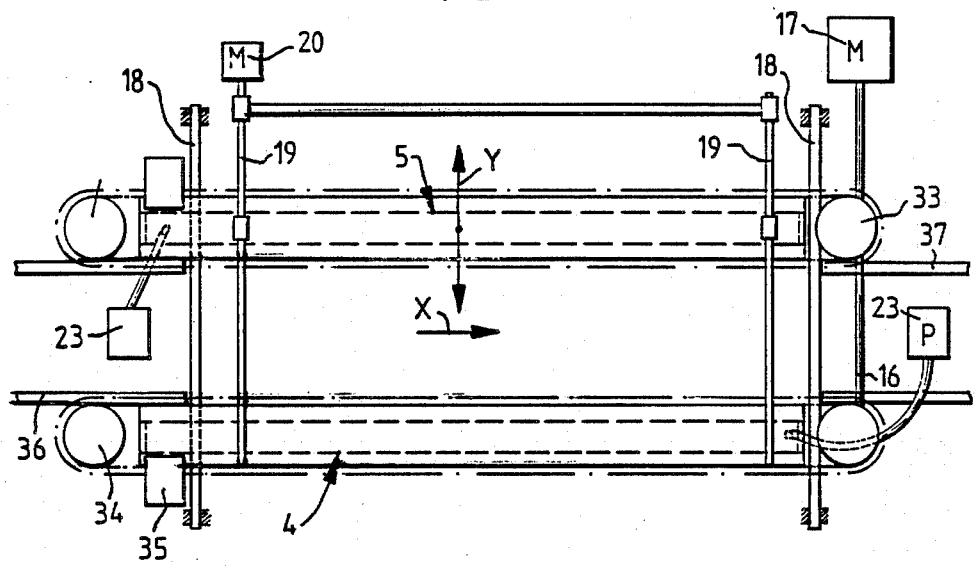
FIG. 3 is a top plan view of a soldering machine according to the invention with a two-cycle cooling system.

In the embodiment according to FIG. 3, profile rods 6 with two coolant ducts 7, 8 are provided as shown in transverse section in FIG. 4. The two coolant ducts of each guide profile 4, 5 are joined to form a coolant cycle in each instance. Each coolant cycle has assigned to it a pump 23, 23', a two-cycle cooling system being formed. The coolant thus flows from pump 23 or 23', along one duct to the end, then over a connection to the other duct and finally back to the pump.

Figure 7A:
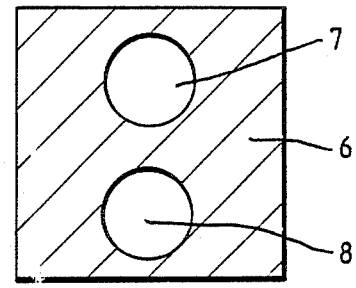
FIGS. 7a, 7b and 7c are schematic transverse section views through the guide profiles of other embodiments of the invention with differently designed coolant ducts.
Figure 7B:
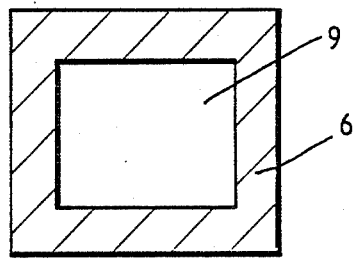
Figure 7C:
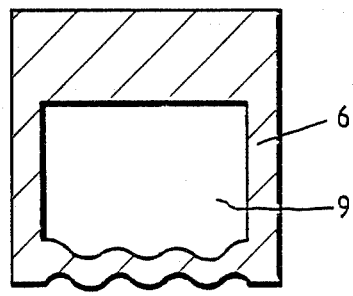

FIGS. 7a, 7b and 7c show transverse sections through differently designed profile rods 6 of the two guide profiles 4, 5. In FIG. 7a, two coolant ducts 7, 8 of circular cross section, arranged one above the other according to FIG. 4, are provided. In the profile rod 6 according to FIG. 7b, a coolant duct 9 of rectangular cross section is provided. In the profile rod 6 according to FIG. 7c, the one coolant duct 9 is formed at the bottom with waves extending in the longitudinal direction of the profile rod. The purpose of this is to enlarge the cooling surface in the interior of the profile rod 6.

Figure 2:
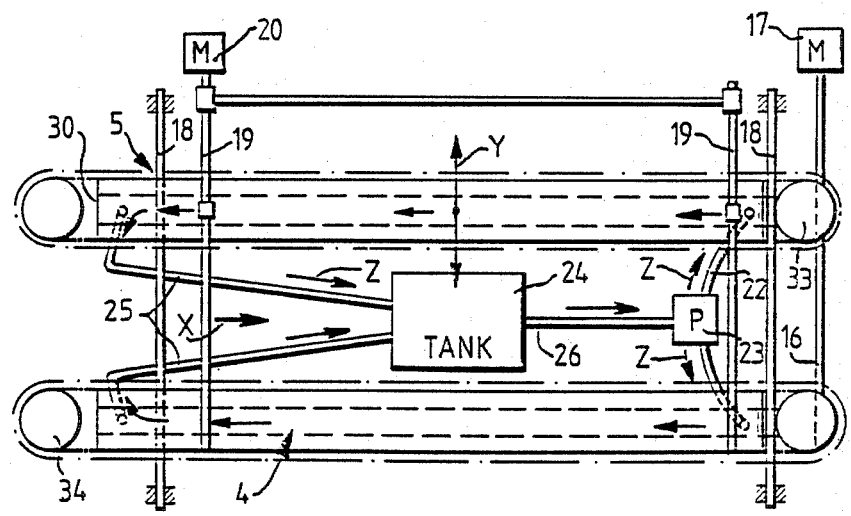
FIG. 2 is a top plan view of a soldering machine according to the invention with a single cycle cooling system and intermediate cooling tank.

The ends of the coolant ducts 6 to 9 are closed by seals 30 (FIGS. 1 and 2). The connecting hoses 21 and 22 are connected to the coolant ducts by means of downwardly extending connection pieces 31. At the ends of the guide profiles 4, 5, the revolving roller chains 10 run around deflecting wheels 33, 34. Wheels 33 of each profile is rotated by shaft 16. On the respective outer or return side of the roller chains 10, chain washing devices 35 are installed (FIG. 3). On either side of the soldering machine, entrance or exit rails 36, 37, respectively, are contiguous to those on the inner or soldering side of the guide profiles 4, 5 (FIG. 3).

Thus, in the soldering machine according to the invention, neither changes of length nor deflections (sags) occur at the adjustable guide profile 5 even with different heating relative to the fixed guide profile 4, so that the soldering fingers 14 of each guide profile 4, 5 are guided at equal height or respectively at equal distance above the soldering machine.

It is noted that any of the ducts may have different cross sectional shapes such as those shown in FIGS. 7a, 7b and 7c, despite their use in the embodiments in FIGS. 1, 2, or 3.

While specific embodiments of the invention have been shown and described in detail to illustrate the application of the principles of the invention, it will be understood that the invention may be embodied otherewise without departing from such principles.

What is claimed is:

1. A soldering machine for soldering objects, comprising a fluxer for applying flux to an object, a preheater for preheating the object, a solder bath for applying solder to the object, the fluxer, preheater and solder bath lying in succession in a transport direction for the object, a fixed guide profile extending parallel to the transport direction adjacent the fluxer, preheater and solder bath, an adjustable guide profile extending parallel to the transport direction adjacent the fluxer, preheater and solder bath, said adjustable guide profile being spaced by a variable amount from the fixed guide profile in a direction across the transport direction for adjusting the distance between the fixed and adjustable guide profiles, each guide profile including at least one coolant conduit extending therethrough in the transport direction, and pump means operatively connected to the conduits of the fixed and adjustable guide profiles for pumping coolant through the conduits to cool the guide profiles, each guide profile comprises a profile rod which carries said conduit therein, a pair of chain guides fixed to opposite sides of said profile rod, a roller chain having guide bushings guided in said chain guides for revolving around said profile guide, and a plurality of solder fingers connected to said roller chain and sliding along opposite sides of said guide profile, an object to be soldered being engageable between the soldering fingers of said fixed guide profile and the soldering fingers of said adjustable guide profile.

2. A soldering machine according to claim 1, wherein: said coolant is a fluid.

3. A soldering machine according to claim 2 wherein: said fluid coolant is coolant oil which is circulated through said conduits for uniform distribution of heat.

4. A soldering machine according to claim 2, wherein: said coolant is a coolant gas which is circulated through said conduits for uniform distribution of heat.

5. A soldering machine according to claim 1 wherein said pump means comprises one line for circulating coolant connected between said conduits at one end of said fixed guide profiles, and a pump in said line for circulating coolant to said conduits.

6. A soldering machine according to claim 5 including a further line for circulating coolant connected between said conduits at an opposite end of said guide profiles, said pump circulating coolant in one direction from one conduit to the other, said further line circulating coolant from the other conduit to the one conduit.

7. A soldering machine according to claim 5 including a common tank for holding coolant, a common connecting line connected between said tank and said pump for supplying coolant between said tank and said pump, and a pair of additional coolant circulating lines each connected between one conduit and said tank, whereby said pump operates to circulate coolant in a double cycle to both of said conduits through said common tank and common connecting line.

8. A soldering machine according to claim 1 wherein said pump means includes a separate pump for each duct, each guide profile including an additional duct, coolant being circulated by each pump through said first mentioned and additional duct for each guide profile respectively.

9. A soldering machine according to claim 1 wherein said ducts are circular in cross section.

10. A soldering machine according to claim 1 wherein each of said ducts is rectangular in cross section.

* * * * *